No. 864,631. PATENTED AUG. 27, 1907.
T. J. FEGLEY.
ICE CREAM FREEZER CAN.
APPLICATION FILED DEC. 7, 1904.
2 SHEETS—SHEET 1.
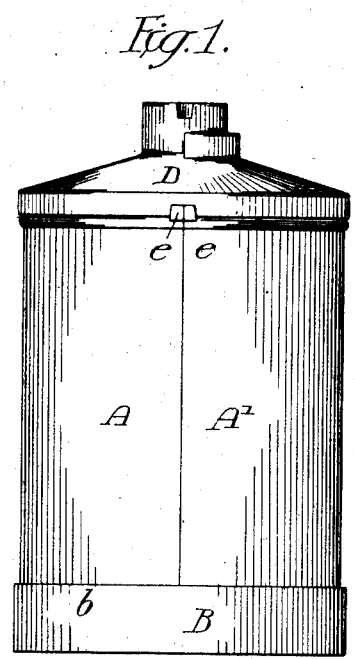
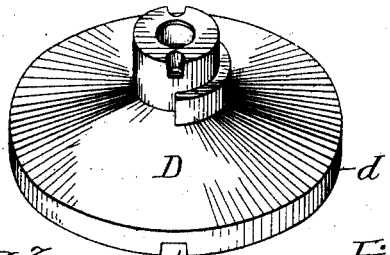
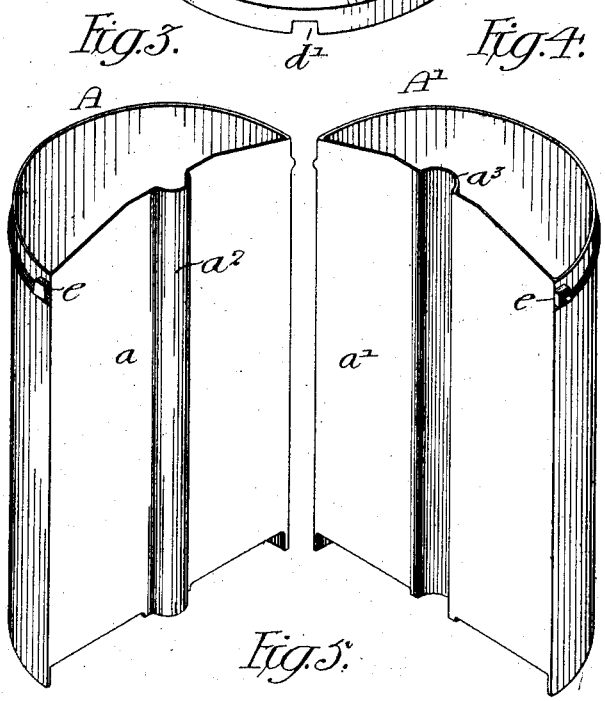
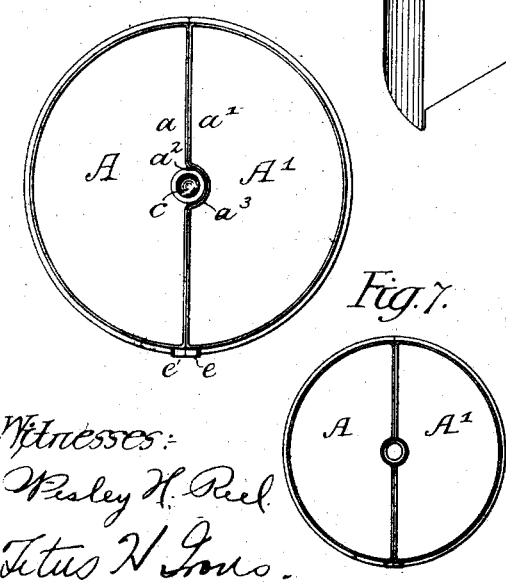
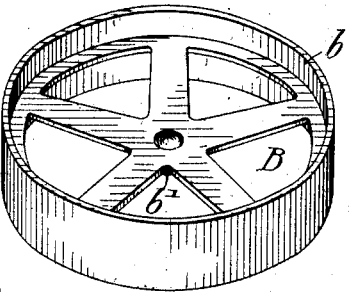
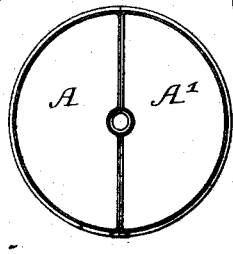
Witnesses:
Wesley H. Reel
Titus N. Invs.
Inventor
Thomas J. Fegley
by his Attorneys
Howson & Howson No. 864,631. PATENTED AUG. 27, 1907.
T. J. FEGLEY.
ICE CREAM FREEZER CAN.
APPLICATION FILED DEC. 7, 1904.
2 SHEETS—SHEET 2.
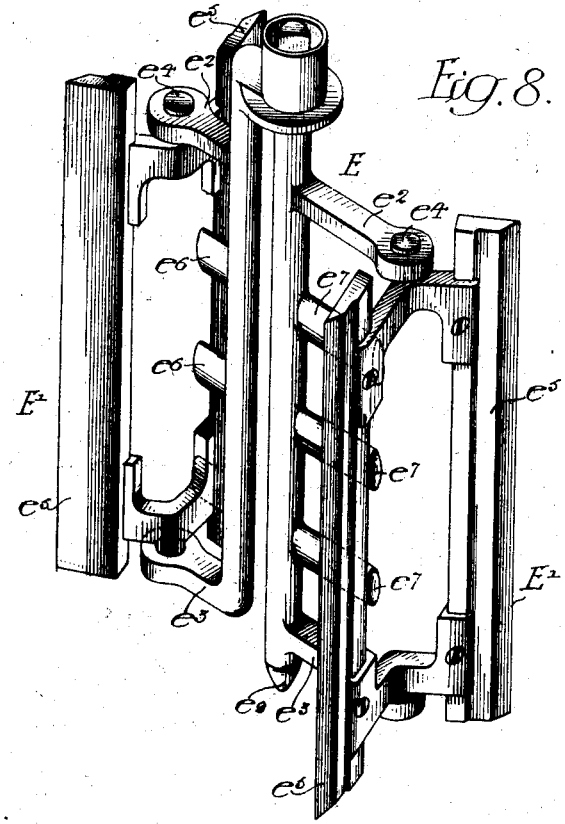
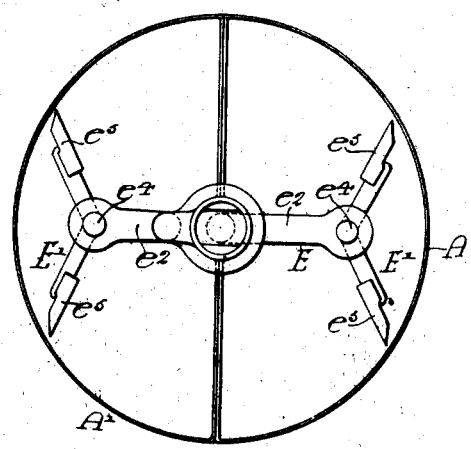

UNITED STATES PATENT OFFICE.

THOMAS J. FEGLEY, OF PHILADELPHIA, PENNSYLVANIA, ASSIGNOR TO NORTH BROTHERS MANUFACTURING COMPANY, OF PHILADELPHIA, PENNSYLVANIA, A CORPORATION OF PENNSYLVANIA.

ICE-CREAM-FREEZER CAN.

No. 864,631.   Specification of Letters Patent.   Patented Aug. 27, 1907.

Application filed December 7, 1904. Serial No. 235,849.

*To all whom it may concern:*

Be it known that I, THOMAS J. FEGLEY, a citizen of the United States, residing in Philadelphia, Pennsylvania, have invented certain Improvements in Ice-Cream-Freezer Cans, of which the following is a specification.

My invention is especially designed for use in connection with what may be termed a double ice cream freezer, that is to say, one in which two flavors of ice cream can be made at one operation. Prior to my invention freezers of this type have been constructed but the can was made in a single piece having a partition through the center, and a dasher was provided for each compartment of the can and said dashers were reciprocated within their respective compartments so as to work the ice cream during the process of freezing.

The object of my invention is to provide a two-part can, one part being entirely independent of the other, so that when the ice cream is made each section can be independently handled.

This object I attain in the following manner, reference being had to the accompanying drawings, in which:—

Figure 1, is a side view of my improved can for ice cream freezers; Fig. 2, is a plan view with the cap removed; Figs. 3 and 4, are detached perspective views of the two sections; Fig. 5, is a perspective view of the bottom plate; Fig. 6, is a perspective view of the cap; Fig. 7, is a view of a modification; Fig. 8 is a perspective view of the preferred form of dasher used with the can illustrated in the previous figures, and, Fig. 9 is a plan of my improved can, showing the dasher in position therein.

A, A′ are the two sections of the can made semi-cylindrical as shown in Fig. 2, each section being closed at the bottom and open at the top. The flat sides $a$, $a'$ of the sections are placed together and the side $a$ has an external rib $a^2$ while the side $a'$ has an internal rib $a^3$, so that when the sides are placed together the two ribs are in the position shown in Fig. 2, at one side of the center so that the central stem of the dasher can freely rotate in the section A, which is provided at the bottom with a step $c$ to receive the end of the dasher.

The dasher is oscillated by any suitable means and is made double. The arms of the dasher are so formed that one arm reciprocates in the section A while the other arm reciprocates in the section A′.

In order to hold the two sections A, A′ together I provide a bottom plate B having a flange $b$ within which rest the lower ends of the sections A, A′, while the upper ends of the sections are held together by a cap D which has a flange $d$ overlapping the upper ends of the sections A, A′ and this flange is notched at $d'$ so as to pass over wedge shaped blocks $e$, $e$ in the section A. When the two sections are mounted in the base and the cap placed over the sections the said sections are held rigidly together, the lugs $e$ on each section which enter the notch in the flange $d$ of the cap lock the sections to the cap, so that when the cap is turned the sections must necessarily turn with it. The bottom plate has a pivot point $b'$, which rests in a suitable seat in the tub of the freezer.

The form of dasher preferably used with my improved can is illustrated in Figs. 8 and 9, and may be described as consisting of a frame E, whose body is of an inverted "U" shape. The end of one member of said body is pointed, as at $e^9$ to fit the step $c$ in the bottom of one of the can sections, while its upper part is provided with a recessed lug $e'$ shaped to receive a suitable operating handle whereby the dasher may be oscillated.

Projecting horizontally from each of the side members of the body portion are a pair of arms $e^2$ and $e^3$, between which is hung a double edged dasher blade E′, capable of oscillation upon the vertical axis formed by pins $e^4$ acting in suitable holes in said arms. Each blade in the present instance includes two vertically extending scrapers $e^5$, rigidly connected by transverse pieces upon which are the pivot pins $e^4$.

Arms $e^6$ and $e^7$ project from the members of the frame body E intermediate of and in the same plane as, the arms $e^2$ and $e^3$, serving with them and with the blades E′ to agitate the material in the can sections. Under operating conditions, one member of the frame E with its arms and blade E′, acts within one of the can sections, while the other member and its parts acts in the second of said sections.

It will be understood that I do not limit myself to a freezer can which oscillates while the dasher remains stationary, as my invention can be used with a stationary freezer can and an oscillatory dasher or in a combination in which both the dasher and the can oscillate.

In Fig. 7 I have shown a modification in which both sections have internal vertical ribs so as to form a space between the two sections for the passage of the stem of the dasher when it is desired to mount the stem of the dasher outside the can. In this instance each arm of the dasher will be hung from the upper end of the stem.

I claim as my invention:—

1. The combination in an ice cream freezer can, of two separable sections, a removable bottom plate and a cap, both common to both sections, for holding the same together, with a dasher operative in said sections, substantially as described.

2. The combination of an ice cream freezer can having two semi-cylindrical sections closed at the bottom and open at the top, the flat side of each section having a hollow rib formed thereon, with a dasher having a member fitting into the hollow formed by said ribs and provided with portions respectively operative in said two can sections, substantially as described.

3. The combination in an ice cream freezer can, of two semi-cylindrical sections closed at the bottom and open at the top, each section having a flat side, an external vertical rib formed on the flat side of one section, an internal vertical rib formed on the flat side of the other section, and a dasher having members respectively operative in the two can sections, there being a bearing in the bottom of one of said sections for said dasher, substantially as described.

4. The combination, in an ice cream freezer can, of two sections closed at the bottom and open at the top, a flanged bottom plate in which the two sections rest, a flanged cap for closing both sections and for holding them together, and lugs on the sections fitting notches in the flange of the cap so as to lock the two together, substantially as described.

In testimony whereof, I have signed my name to this specification, in the presence of two subscribing witnesses.

THOMAS J. FEGLEY.

Witnesses:
WILL. A. BARR,
JOS. H. KLEIN.